Oct. 18, 1955   P. LANDRUM   2,720,764
FLEXIBLE POWER TRANSMISSION
Filed Nov. 3, 1950

INVENTOR.
PORTER LANDRUM
BY
Jennings & Carter
ATTORNEYS

United States Patent Office 2,720,764
Patented Oct. 18, 1955

2,720,764

FLEXIBLE POWER TRANSMISSION

Porter Landrum, Birmingham, Ala.

Application November 3, 1950, Serial No. 193,831

3 Claims. (Cl. 64—27)

My present invention relates to flexible power transmissions of the type embodying a resilient load transmitting member such as a torsion spring or a block or cylinder of rubber.

An object of my invention is to provide a flexible power transmission embodying a driving element adapted to be secured to the power shaft of an engine, a driven element, a flexible power transmitting member operatively connected between the driving and driven elements, and an inclined stop on either the driving or driven element together with a projection carried by the other of said elements disposed to contact the inclined stop when the flexible member is stressed a predetermined amount, thereby to obtain the improved operational advantages hereinafter pointed out.

Another object is to provide a power transmission unit of the character designated in which the mechanical stop arrangement comprising the inclined or wedge-like surface and the projection cooperable therewith are relatively disposed so as to increase the life of the power transmitting flexible member, providing a unit which is trouble free, and one which is free of objectionable noises occasioned by the engagement of the types of stop means for such mechanisms which have heretofore been used.

In actual use of flexible power transmissions of the general type described herein and which have been sold by me and widely used on motorcycles, the shearing of stop members and failure of the steel or rubber torsion springs employed therewith have been two major sources of trouble. The flexible power transmissions heretofore made by me have embodied stop means between the driving and driven elements in the form of squarely abutting shoulders and the like. When the engine load suddenly reached its maximum, the stop shoulders or the key connecting the driving element to the engine shaft were often sheared. In the past I have attempted to overcome this by making the stops heavier and by increasing the resistance of the spring to torsion. In the first case the only result was more frequently shear keys; in the second case, the torsion spring, either the steel spring or rubber type, was overworked and failed in such a short time as to make the device impractical. Further, if the resistance of a torsion spring is too great the device fails to perform its intended purpose of cushioning the power impulses of the engine.

In order to overcome the above difficulties I have formed on one of the elements of the transmission, preferably the driven element thereof, a pair of diametrically opposed, wedge-like stops. Projecting in the path of the stops are a pair of members having rounded surfaces, such as a pair of ordinary bolts, pins or the like. Initially, the torsion member, preferably a rubber cylinder suitably vulcanized between metal sleeves and secured in driving relation between the elements, is so set that the pins are out of contact with the inclined stops. The distance of travel before contacting the stops may vary for given transmissions, depending upon the desired resiliency of the spring, the power to be transmitted, and other factors not necessary to be mentioned here. When power is suddenly applied, or when the engine is delivering a predetermined amount of power, the driving and driven elements rotate relative to each other sufficiently for the pins to contact the stops and tend to ride up on the inclined surfaces thereof. I have discovered that the inherent resiliency of the metal parts of the device is sufficient to prevent shearing of the pins or key even though the spring at the instant of contact is taking only a small part of the load. Such construction is also noiseless. I may provide similarly inclined stops for the pins to engage when they move in the reverse direction, as when the driven element drives the driving element, such for instance as when the motorcycle is coasting in gear down a steep grade.

Apparatus illustrating the features of my invention is shown in the accompanying drawings forming a part of this application in which.

Figures 1, 2:
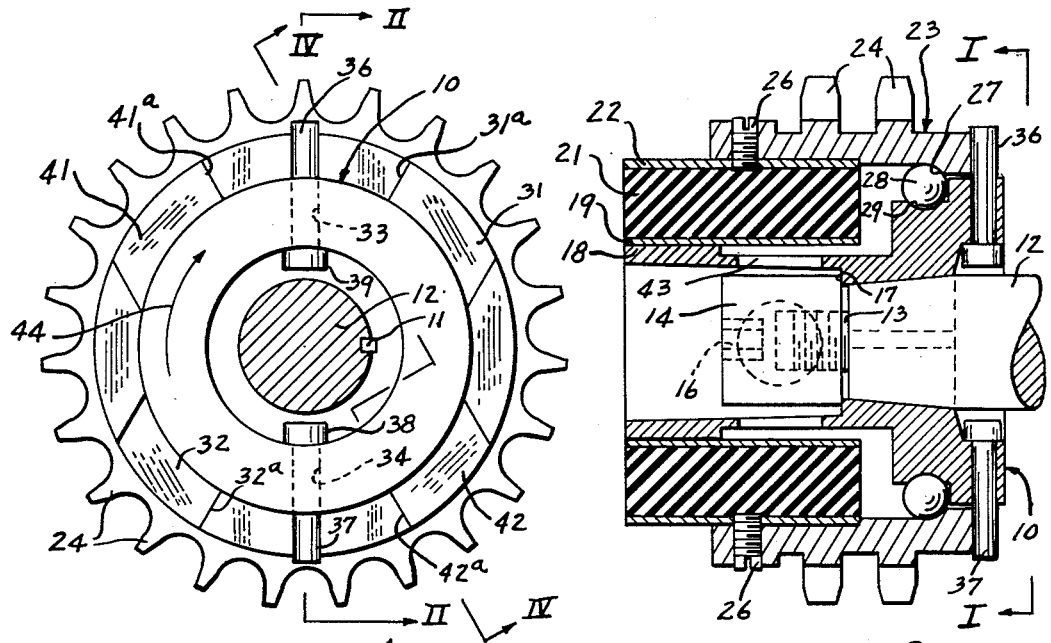
Fig. 1 is a view taken generally along line I—I of Fig. 2 and looking at the end of the transmission placed adjacent the crank case of the engine, hereinafter referred to as the inner end.
Fig. 2 is a detail sectional view taken generally along line II—II of Fig.1.
Figures 3, 4:
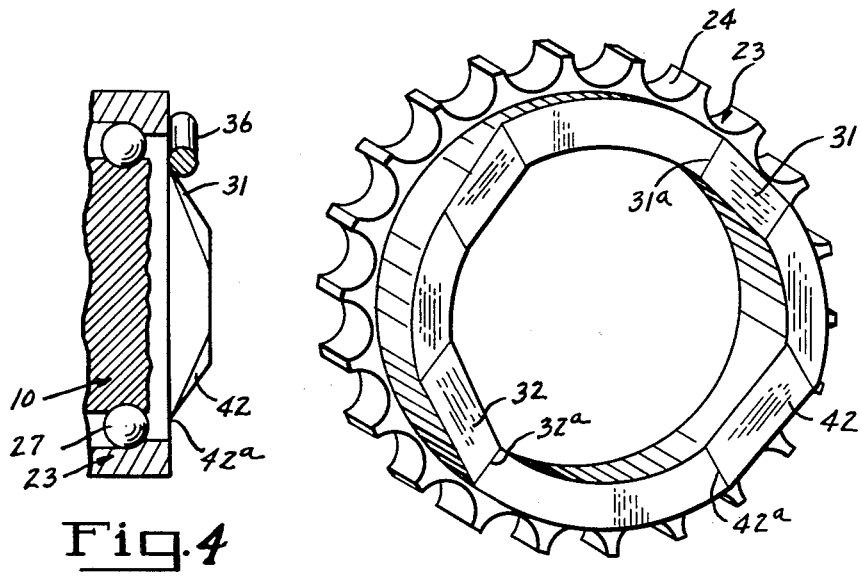
Fig. 3 is a somewhat diagrammatic perspective view looking at the inner end of the driven member and showing the inclined or wedge-like stops thereon; and, Fig. 4 is a detail sectional view taken generally along line IV—IV of Fig. 1.

Referring now to the drawings for a better understanding of my invention, my improved flexible power transmission comprises a driving element indicated generally by the numeral 10. The driving element may be secured by means of a key 11 to a tapered portion of an engine shaft 12. The shaft 12 may be reduced and threaded as indicated at 13 and the driving element 10 may be held on the shaft by means of a nut 14 having therein a tool receiving opening 16 by means of which the nut may be tightened. The inner face of the nut 14 engages a shoulder 17 formed on the driving element, thus holding the driving element on the shaft 12.

The driving element 10 may embody an outer end portion 18, slightly larger in diameter than the next adjacent body portion thereof. Pressed onto the portion 18 of the driving element is an inner sleeve 19 around which is suitably vulcanized a cylinder of rubber 21. Surrounding the cylinder of rubber 21 and vulcanized thereto is an outer sleeve 22. The inner sleeve is pressed tightly onto the portion 18 of the driving element and is non-rotatably secured thereto.

The driven element of my improved transmission is indicated generally by the numeral 23 and is disposed to fit about the driving element in the manner shown. The driven element may carry sprocket teeth 24 or the like by means of which power from the shaft 12 may be transmitted as will later appear. The outer sleeve 22 surrounding flexible member 21 is non-rotatably secured to the driven member by means of set screws 26.

The element 23 is provided with a rounded seat 27 for receiving a row of balls 28. The seat 27 is formed as an inwardly projecting reduced diameter portion in the bore of the driven element, but as will be seen from the drawings does not prevent the driven element from being slid over the driving element in assembling the unit. The driving element is provided with a complementary seat 29 in which the balls fit, the seats 27 and 29 thus in effect forming outer and inner races, respectively, for the row of balls 28. The driving and driven elements thus are held concentric relative to each other and are free for relative rotation, being supported for this purpose on the balls 28.

On the inner end of the driven element 23 I provide a pair of inclined, wedge-like surfaces 31 and 32 which are substantially diametrically opposed. It will be noted that the edges 31a and 32a of the surfaces are directed substantially radially of the element 23.

The driving element 10 projects at the inner end past the inner end of the driven element 23 and is provided with a pair of diametrically opposed radially extending openings 33 and 34. In the openings 33 and 34 are radially disposed pins 36 and 37 which may have heads 38 and 39. The pins 36 and 37 lie in the path of the wedge-like surfaces or stops 31 and 32 and are disposed to engage the forward edges 31a and 32a thereof when the driving element and driven element rotate relative to each other a predetermined distance.

In order to provide shoulders which will be engaged by the pins 36 and 37 when the driving and driven elements rotate in an opposite direction relative to each other, I may provide similar wedge-like surfaces 41 and 42, having edges 41a and 42a similar to the edges 31a and 32a.

When using rubber springs I have found that it is desirable to dissipate the heat generated in the rubber in order to prolong the life of the rubber. To this end I may provide openings 43 in the driving element as indicated in Fig. 2 of the drawing. Cooling air thus is free to circulate inwardly of the device, through the central opening of the driving element, through openings 43, and thence pass out around the balls 28 through the space between the driving and driven elements.

In assembling the device it will be seen that the balls 28 can be laid in the groove 29 of the driving element and the driving element then inserted into the driven element. With the device removed from the shaft 12 the pins 36 and 37 are put in place by inserting them from the inner ends of the openings 33 and 34. In this position the pins hold the device assembled since the shaft 12 prevents the pins from falling out of their openings. The screws 26 serve to secure the outer sleeve 22 to the driven element.

The rubber spring, or the steel coil spring if one is used in lieu thereof, is so positioned that the pins 36 and 37 lie substantially between the tapered ends of surfaces 31 and 32 when the device is at rest. Likewise, the pins 36 and 37 are substantially equi-distant between the tapered ends of the surfaces 41 and 42.

With the device assembled as just set forth it will be apparent that if the driving element 10 is rotated in the direction of the arrow 44 by shaft 12 against a load on driven element 23, the flexible rubber cylinder permits relative rotational movement between the driving and driven elements. The amount of this movement is predetermined in known ways for the load to be transmitted. Suffice it to say here that if failure of the rubber member or of a coil spring is to be prevented, it is not permissible to work the rubber or spring to its fullest extent. That is to say, one must, by mechanical means limit the rotational movement between the driving and driven elements if the yieldable drive member is to have long enough life to make it practical and yet be sufficiently resilient to cushion the engine. Thus, when the rounded pins 36 and 37 contact the inclined edges 31a and 32a of surfaces 31 and 32, the pins 36 and 37 tend to ride up on the surfaces, effecting a mechanical stop and limiting the relative rotational movement between the driving and driven elements. As before stated, I have found that this engagement between the pins and the tapered surfaces is effective to provide a very smooth and gradual stop even if the shaft 12 is suddenly rotated with such acceleration as to almost instantaneously stress the rubber 21 to its fullest extent. Furthermore, I have found that the engagement of the pins 36 and 37 with their respective tapered surfaces is substantially noiseless, eliminating one of the major sources of difficulty with this general type of transmission.

The tapered surfaces 41 and 42 function precisely in the manner stated, serving to prevent damage due to excessive twisting of the rubber should the engine backfire or in those cases in which the wheels of the vehicle actually turn the engine, as when proceeding downhill with the throttle closed. In both instances it will be apparent that the rounded stops 36 and 37 engage their respective inclined surfaces. It will be understood that the pins 36 and 37 do not ride up onto the inclined surfaces to any appreciable extent, but I provide a substantial inclined surface in order to compensate for wear of the pins should this occur. However, in actual practice the wear of the pins is substantially negligible.

In addition to providing the improved stop means it will be seen that I have provided a flexible power transmission in which the pins themselves serve also as a means for holding the device assembled. This is particularly advantageous since this method of assembly greatly simplifies the construction of the apparatus, eliminating set screws, bolts, threads and the like.

With a transmission constructed in accordance with my invention I am enabled to limit the angle through which the rubber drive member or the spring is to be worked, and hence am enabled to accurately select a spring which affords the proper amount of resiliency for the installation at hand.

From the foregoing it will be apparent that I have devised an improved flexible transmission which is fully effective for its intended purposes. The device is extremely simple of construction and has proven in actual practice to be trouble free in operation and noiseless. It permits the selection of a rubber or steel spring having the proper amount of resiliency.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a flexible power transmission, a generally cylindrical driving element, a generally cylindrical driven element having a portion encircling the driving element, a bearing between the elements mounting them for rotation relative to each other, a flexible load transmitting member operatively interposed between and non-rotatably secured to said elements, a pair of diametrically spaced wedge-like stops carried on the end of the driven member, and a pair of radially disposed removable pins carried by the driving element and extending outwardly thereof in a direction susbtantially normal to the longitudinal axis of said elements in position to contact the wedge-like stops upon pre-determined relative rotation between the elements.

2. In a flexible power transmission, a driving member disposed to be secured to a shaft, an annular raceway for a row of ball bearings adjacent one end of said driving element, a driven element having a portion fitting about the driving element, an inwardly extending annular shoulder on the driven member adjacent one end thereof disposed to engage the balls in the upper quadrant thereof and forming a complementary raceway for a row of ball bearings, a row of ball bearings seated in said raceways, a flexible power transmitting member operatively interposed between and non-rotatably secured to the driving and driven elements, a wedge-like stop shoulder on the end of the driven element, and a removable radially disposed pin carried by the driving element engaging the wedge-like stop shoulder on the end of the driven element and limiting rotation of said elements with respect to each other.

3. In a flexible power transmission, a generally cylindrical driving element adapted to be non-rotatably secured to a power shaft, an enlarged diameter portion on the driving element near one end thereof, an annular raceway for a row of ball bearings in said enlarged end of the driving element, a row of ball bearings in said raceway, a generally cylindrical driven element surrounding the driving element, an inwardly projecting annular enlargement in the bore of the driven element having an annular rounded surface engaging the balls only in the upper quadrants thereof toward the enlarged end of the driving member, said inwardly projecting enlargement being of a diameter to pass freely over the enlarged end of the driving member, a pair of radially disposed pins carried by the enlarged end of the driving member and slidably engaging the adjacent end of the driven member, and a pair of wedge-like stops on the end of the driven member disposed in the path of the pins and against which the pins strike upon predetermined rotation between the driving and driven elements.

References Cited in the file of this patent

UNITED STATES PATENTS

| | | |
|---|---|---|
| 2,233,539 | Landrum | Mar. 4, 1941 |
| 2,234,443 | Macbeth | Mar. 11, 1941 |